INVENTOR.
PHILIP D. COREY
BY Isidore Match
HIS ATTORNEY

June 20, 1967 P. D. COREY 3,327,200
CONTROL CIRCUIT FOR STATIC INVERTER
Filed Dec. 17, 1963 3 Sheets-Sheet 2

INVENTOR.
PHILIP D. COREY
BY Isidore Match
HIS ATTORNEY

United States Patent Office 3,327,200
Patented June 20, 1967

3,327,200
CONTROL CIRCUIT FOR STATIC INVERTER
Philip D. Corey, Waynesboro, Va., assignor to General
Electric Company, a corporation of New York
Filed Dec. 17, 1963, Ser. No. 331,180
9 Claims. (Cl. 321—45)

This invention relates to inverter circuits. More particularly, it relates to inverter circuits for converting direct current power to alternating current power employing gate controlled rectifiers as the power switching elements therein.

Heretofore, in the operation of DC to AC inverter circuits employing gate controlled rectifiers, a major problem has been encountered when, at the end of a half cycle of operation, it is desired to render the conductive gate controlled rectifier nonconductive and to render a complementary gate controlled rectifier conductive to initiate the next cycle of opposite polarity conduction. This changing of conductivity from one switching element to the other switching element in the operating cycle of an inverter is commonly referred to as commutation.

Many commutation circuits have been devised heretofore. Generally, such commutation circuits include an arrangement wherein a large capacitor is charged up during a relatively long half cycle of operation and which is discharged during the relatively short interval when the commutation operation is performed, the discharging of the capacitor supply load current during the commutation.

For power inverter circuits to be effective in operation, they have to meet major requirements such as the ability to drive reactive loads and to operate under no load conditions. Many known circuits have this ability. Also, in such known circuits, the commutating capacitor may be relatively small since the value of this capacitor depends upon the maximum amount of current to be commutated and does not have the function of correcting for reactive current.

A persistent problem which still exists with these latter known circuits results from the fact that currents of high RMS value are forced to flow through an output transformer and the DC power source during the commutation interval. This is, of course, highly undesirable since such output transformer consequently has to be quite large to avoid its being overheated. Also, depending upon the impedance of the DC power source, appreciable ripple is induced on the DC supply voltage when these RMS currents flow therethrough.

It is, accordingly, an important object of this invention to provide an inverter circuit which has the ability to drive reactive loads, which can operate at no load conditions, which permits the commutating capacitor to be small and in which high alternating RMS commutation currents are prevented from flowing through the output transformer and/or the DC power source, thereby permitting the use of an output transformer of substantially minimized size and weight and whereby any ripple induced on the DC supply voltage is also substantially minimized.

It is another object to provide an inverter in accordance with the preceding object which is of high efficiency and light weight.

Generally speaking and in accordance with the invention, there is provided a circuit for converting the output of a unidirectional potential source to an AC output comprising a first series arrangement of first and second gate controlled rectifiers connected across the source and a second series arrangement of third and fourth gate controlled rectifiers connected across the source. A commutating capacitor is connected between the junctions of the first and second and third and fourth gate controlled rectifiers respectively. Generating means are included for gating the first and third gate controlled rectifiers alternately at successive half cycles of output from the AC source. There are further provided means in circuit with the AC source for phase shifting the output thereof and for gating the second and fourth gate controlled rectifiers alternately at successive half cycles of the phase shifted output, the first and second, and the third and fourth gate controlled rectifiers respectively being gated by like polarity half cycles of output from the AC source and the phase shifting means.

The features of this invention which are believed to be new are set forth with particularity in the appended claims. The invention itself, however, may best be understood by reference to the following description when taken in conjunction with the accompanying drawings which show embodiments of static inverters according to the invention.

In the drawing, FIG. 1 is a schematic depiction of a bridge inverter constructed in accordance with the principles of the invention;

Figure 1:
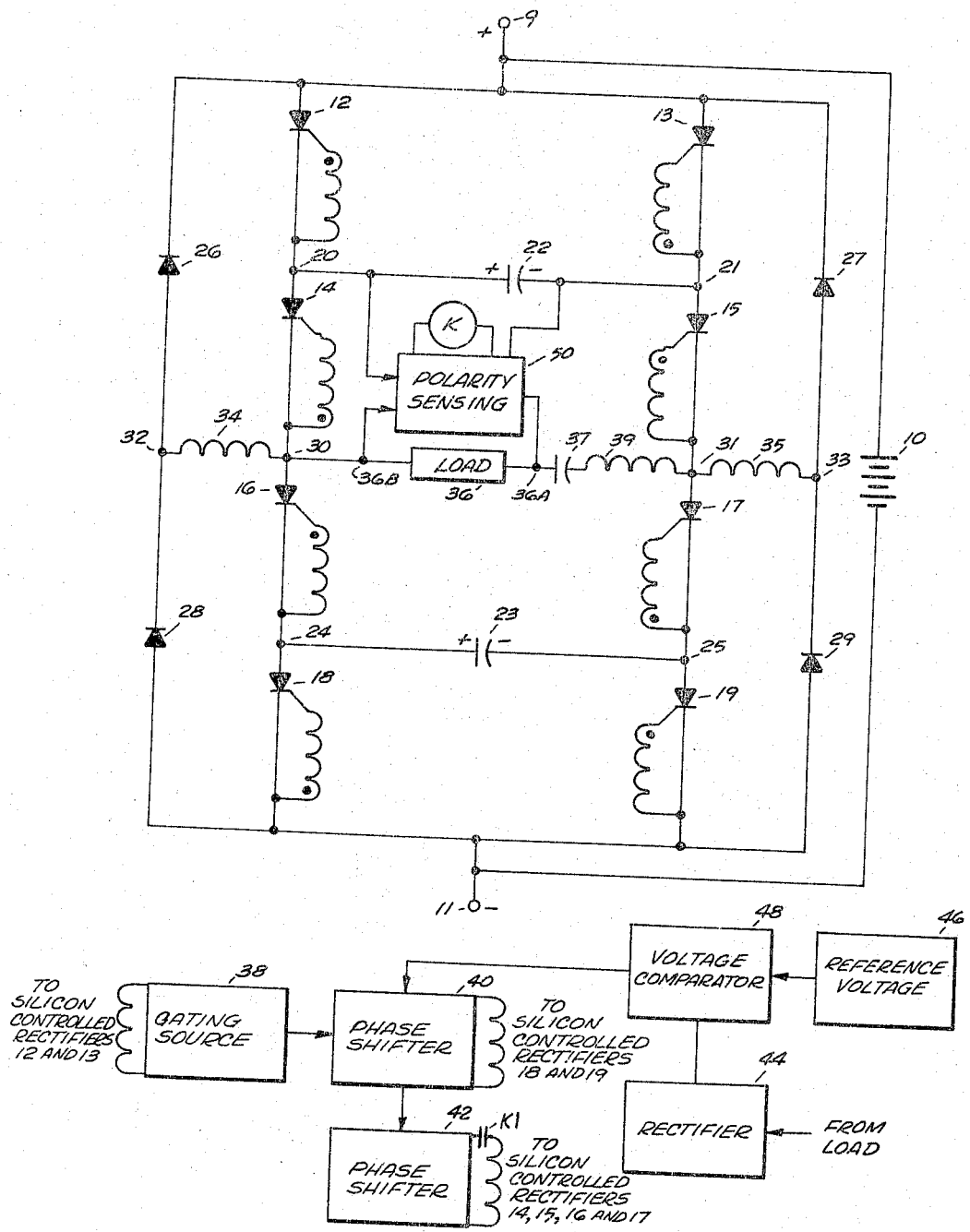

Referring now to FIG. 1 wherein there is shown a bridge type static inverter employing gate controlled rectifiers as the switching elements therein and constructed in accordance with the principles of the invention. A source of unidirectional potential 10, depicted as a battery, provides the voltage which is to be converted to an alternating current voltage of a chosen frequency. Connected across source 10 is the anode to cathode path of a power switching silicon controlled rectifier 12, the anode to cathode path of a commutating silicon controlled rectifier 14, the anode to cathode path of a commutating silicon controlled rectifier 16, and the anode to cathode path of a power switching silicon controlled rectifier 18.

Also connected across the unidirectional potential source is the anode to cathode path of a power switching silicon controlled rectifier 13, the anode to cathode path of a commutating silicon controlled rectifier 15, the anode to cathode path of a commutating silicon controlled rectifier 17, and the anode to cathode path of a power switching silicon controlled rectifier 19. Connected between the junction 20 of silicon controlled rectifiers 12 and 14 and the junction 21 of silicon controlled rectifiers 13 and 15 is a commutating capacitor 22 and connected between the junction 24 of silicon controlled rectifiers 16 and 18 and the junction 25 of silicon controlled rectifiers 17 and 19 is a commutating capacitor 23. A series arrangement of the cathode to anode paths of "pumpback" diodes 26 and 28 and a series arrangement of the cathode to anode paths of pumpback diodes 27 and 29 is connected between the positive terminal 9 and the negative terminal 11 of source 10 and connected between the junction 32 of diodes 26 and 28 and the junction 30 of silicon controlled rectifiers 14 and 16 is an inductor 34 and connected between the junction 31 of silicon controlled rectifiers 15 and 17 and the junction 33 of pumpback diodes 27 and 29 is an inductor 35. The output of the circuit is developed across a load 36 which may be reactive.

A gating source 38 which may suitably be a magnetic coupled multivibrator having the desired inverter output frequency supplies the drive to gate silicon controlled rectifiers 12 and 13 at alternate half cycles. The output of gating source 38 may also be applied directly to silicon controlled rectifiers 18 and 19. In this type situation, silicon controlled rectifiers 12 and 19 would simultaneously have applied thereto the output of gating source 38 in one polarity while silicon controlled rectifiers 13 and 18 would have applied thereto the output of gating source 38 in the opposite polarity. As shown in FIG. 1, there may be a phase displacement in the respective applications of the output of gating source 38 to silicon controlled rectifiers 12 and 13, and 18 and 19, respectively. Such phase displacement may be effected by a phase shifter 40 which may be a saturable reactor, a magnetic amplifier or the like, the degree of phase shift imparted by such reactor being responsive to a voltage applied thereto such as a voltage representing a deviation of the output voltage from a desired value. In the operation of the circuit, it is desired to gate into conductivity silicon controlled rectifiers 14 and 17 a very short interval after the gating into conductivity of silicon controlled rectifier 19 and it is correspondingly desired to gate into conductivity silicon controlled rectifiers 15 and 16 a very short interval after the gating into conductivity of silicon controlled rectifier 18. Consequently, the output of phase shifter 40 may be passed through another phase shifter 42 which may also be a saturable device having a fixed and short, i.e., comparatively minimal saturation period.

Considering the operation of the circuit of FIG. 1, if it is assumed that silicon controlled rectifiers 12, 14, 17 and 19 are conductive and assuming that the series arrangement of capacitor 37 and an inductor 39 are not included in the circuit, current flows from the positive terminal 9 of source 10 through silicon controlled rectifiers 12 and 14, load 36, and silicon controlled rectifiers 17 and 19 to negative terminal 11. At the end of the half cycle from gating source 38, during which silicon controlled rectifier 12 is conductive, silicon controlled rectifier 13 is gated into conductivity by the next half cycle from source 38 and capacitor 22 which had charged in the polarity as shown in FIG. 1 during the conductive half cycle of silicon controlled rectifiers 12, 14, 17 and 19 now discharges from its positive side through silicon controlled rectifier 14, inductor 34, pumpback diode 26, and source 10 and silicon controlled rectifier 13 back to its negative side whereby silicon controlled rectifier 12 is reversed biased and commutated into nonconductivity. The load current is now permitted to circulate through silicon controlled rectifiers 17 and 19, pumpback diode 28, inductor 34 and load 36 thus constraining the voltage across load 36 to remain at very nearly zero volts. Now, dependent upon the delay imparted by phase shifter 40, silicon controlled rectifier 18 is gated into conductivity by the output of phase shifter 40. Consequently, capacitor 23 which during the conductive cycle of silicon controlled rectifiers 12, 14, 17 and 19 had charged to the polarity as shown in FIG. 1 discharges from the positive side of capacitor 23 through now conductive silicon controlled rectifier 18, pumpback diode 29, silicon controlled rectifier 17, inductor 35 and back to the negative side of capacitor 23. A short interval later, as determined by the phase shift imparted by phase shifter 42, silicon controlled rectifiers 15 and 16 are gated into conductivity by the output of phase shifter 42 and current can now flow from the positive terminal through silicon controlled rectifiers 13 and 15, through load 36 and silicon controlled rectifiers 16 and 18 to negative terminal 11, capacitors 22 and 23 proceeding to charge in respective polarities opposite to that shown in FIG. 1, this opposite polarity charging causing silicon controlled rectifiers 14 and 17 to regain their forward blocking ability.

Figure 4:
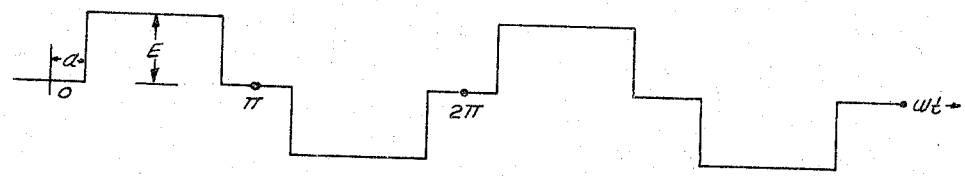
FIG. 4 shows the output waveform produced by the inverter of FIG. 1.

In FIG. 4 there is shown an idealized waveform of a cycle of voltage appearing across load 36. The Fourier series expression for this waveform is equal to:

$$e = \frac{4E}{\pi} \sum_{n=\text{odd}} \cos n\alpha \, \frac{\sin \omega t}{n} \quad (1)$$

The phase shift imparted by phase shifter 40 may be in response to the deviation of the voltage across load 36 from a desired value. Such deviation response can be effected by rectifying a portion of the load voltage in a rectifier 44 and comparing the output of rectifier 44 with a reference voltage from a source 46 which represents the desired output voltage across load 36. The output of rectifier 44 and reference voltage source 46 may be applied to a voltage comparator 48, the difference voltage produced from voltage comparator 48 being applied to phase shifter 40 whereby phase shifter 40 shifts the phase of the output of gating source 38 in accordance with this difference voltage. The phase shifter may have a null point to permit swings in opposite directions whereby the output voltage may be regulated where it is less than or greater than the desired output voltage. It is thus seen that the waveform of FIG. 4 may be a wave which is pulse-width modulated in accordance with the deviation of the output voltage from a desired value. Alternatively, phase shifter 40 need not be responsive to the deviation of the output voltage from a desired value but may be a device which together with phase shifter 42 imparts a 60° phase delay to the output of gating source 38. Thus, when two classic square wave outputs of gating source 38 and phase shifter 42, 60° displaced in phase, are phasorially added, the resulting quasi-square wave has a dwell angle of 30°. With such 30° dwell angle, (angle α), the waveform of FIG. 4 would contain no triplet harmonics. Consequently, the 33⅓% third harmonic, the 11% ninth harmonic, the 6% fifteenth harmonic, etc., would be eliminated, thereby enabling a great reduction in output filter weight in the event that it would be desired to convert the output square wave of the inverter to a relatively pure sinusoidal wave.

In the circuit of FIG. 1, diodes 26, 27, 28 and 29, in addition to providing a circulating path for commutation current, permit the return of energy from load 36 to unidirectional potential source 10 whenever this may be required by the possible reactive nature of the load impedance 36. Inductors 34 and 35, in combination with capacitors 22 and 23, form resonant discharge commutation circuit paths. The series arrangement of inductor 39 and capacitor 37 may be included in series with load 36 to provide a waveform filter.

Figure 2:
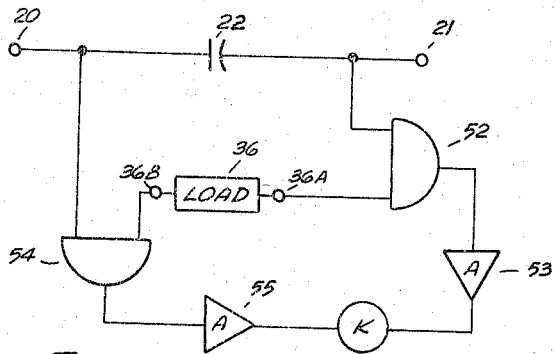
FIG. 2 is a diagram of a circuit suitable for use as the load polarity sensing means in the circuit of FIG. 1.

If it is desired to render the circuit of FIG. 1, short circuit damage proof, then the polarity of the load voltage 36 may be sensed by a polarity sensing arrangement 50, in circuit with capacitor 22 and load 36, a suitable example of which is shown in FIG. 2. In circuit with stage 50 is a relay K which is actuated when the polarity across load is the proper one to show that commutation has duly taken place, whereby normally open contacts K1 associated therewith in the output of phase shifter 42 assume the closed position and the corresponding pairs of silicon controlled rectifiers 14 and 17, or 15 and 16, can be gated into conductivity to connect the load 36 to the unidirectional supply. If the output of stage 50 indicates a failure of commutation, then relay K is not enabled, contacts K1 remain in the open position, and either pair of silicon controlled rectifiers 14 and 17 or 15 and 16 are not gated into conductivity by the output of phase shifter 42. Consequently, in this situation load 36 would not be connected to source 10. With such polarity sensing arrangement, therefore, in the event of a commutation failure which could result from an excessive transient overload, a destructive short circuit would not be imposed on the unidirectional power supply. In the case of such commutation failure, filter capacitor 37 then would block the excessive load currents which might otherwise flow after a commutation failure and on the next half cycle, the commutating capacitors 22 and 23 would be fully recharged and another attempt would be made by the circuit to commutate successfully.

In FIG. 2, there is shown a circuit which may be used as the polarity sensing stage 50 of FIG. 1. In this circuit, terminal 36A of load 36 and side 21 of commutating capacitor 22 are applied as inputs to a circuit 52 which performs an AND function and terminal 36B of load 36 and side 20 of capacitor 22 are applied as inputs to a circuit 54 which also performs an AND function. Amplifiers 53 and 55 are included to amplify the outputs of circuits 52 and 54 when they are enabled. When either of AND circuits 52 or 54 are enabled, relay K is energized to cause the closing of contacts K1 and permit an output from phase shifter 42.

It is seen in FIG. 2 that relay K can only be actuated when side 21 of capacitor 22 and terminal 36A of load 36 are positive, or when there is a coincidence of positive polarities at terminal 36B of load 36 and side 20 of capacitor 22. Thus, pairs of silicon controlled rectifiers 14 and 17 or 15 and 16 can only be rendered conductive when proper commutation has occurred.

Figure 3:
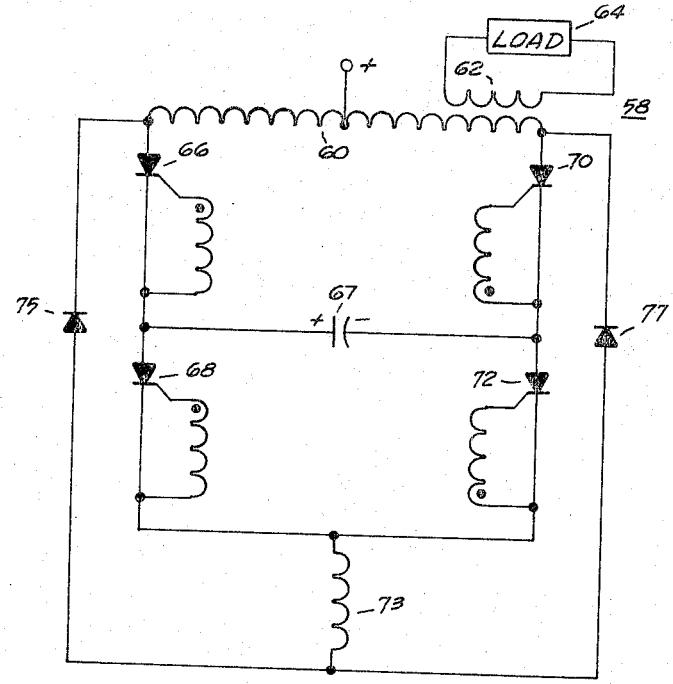
FIG. 3 is a schematic diagram of a center-tapped inverter constructed in accordance with the principles of the invention.
Figure 3:
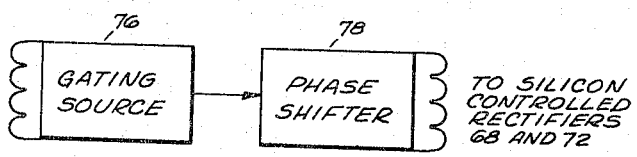

In FIG. 3 there is shown a center-tapped inverter having a commutation arrangement in accordance with the principles of the invention. In the circuit of FIG. 3, for load current to flow through the primary winding 60 of an output transformer 58, silicon controlled rectifiers 66 and 68 or silicon controlled rectifiers 70 and 72 have to be concurrently conductive. In the arrangement of FIG. 3, the output of gating source 76 is applied to the gate electrodes of silicon controlled rectifiers 66 and 70 and the output of phase shifter 78, if one is used, is applied to the gate electrodes of silicon controlled rectifiers 68 and 72.

In the operation of the circuit of FIG. 3, if it is assumed that silicon controlled rectifiers 66 and 68 are conductive whereby current flows from the positive terminal of the unidirectional potential source through silicon controlled rectifiers 66 and 68 to the negative terminal thereof, at the initiation of the next half cycle of the output from gating source 76, silicon controlled rectifier 70 is rendered conductive whereby capacitor 67 is permitted to discharge from its positive side through silicon controlled rectifier 68, inductor 73, pumpback diode 77, and silicon controlled rectifier 70 to the negative side of capacitor 67. After capacitor 67 has discharged, no current flows through primary winding 60 and consequently through load 64 until silicon controlled rectifier 72 is gated into conductivity by the output of phase shifter 78 at which time current can now flow from the positive terminal of the unidirectional potential source through primary winding 60 and silicon controlled rectifiers 70 and 72 to the negative terminal of the supply.

Figure 5:
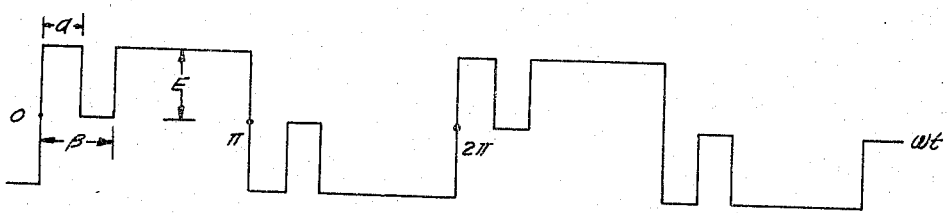
FIG. 5 shows the output waveform produced by the inverter of FIG. 3.

In FIG. 5 where there is shown the waveform appearing in primary winding 60 in the circuit of FIG. 3, the positive half cycle, the first pulse shown in FIG. 5, is that which occurs when silicon controlled rectifier 66 is rendered conductive by the next half cycle of output from gating source 76 after silicon controlled rectifiers 70 and 72 have been conductive whereby capacitor 67 is discharging through silicon controlled rectifier 72, inductor 73, diode 75, and silicon controlled rectifier 66. After capacitor 67 has so discharged, there is no current for a period, through primary winding 60. Then when silicon controlled rectifier 68 is gated into conductivity, the next wider pulse of the pulse of the positive half cycle in FIG. 5 indicates the period of concurrent conductivity of silicon controlled rectifiers 66 and 68. The same corresponding events obtain for the negative half cycle of output.

The Fourier expression for the waveform of FIG. 5 is as follows:

$$e = \frac{2E}{\pi} \sum_{n=odd} \left[ (2-\cos n\alpha + \cos n\beta) \frac{\sin n\omega t}{n} + (\sin n\alpha + \cos n\beta) \frac{\cos n\omega t}{n} \right] \quad (2)$$

Thus, with the circuit of FIG. 3, the output voltage can also be regulated by a pulse width modulation scheme as shown in the circuit of FIG. 1. It is, of course, to be realized that the waveform of FIG. 5 generally contains a higher percentage of harmonic contents, than that of the waveform of FIG. 4.

The advantages presented by the circuit constructed in accordance with the principles of this invention are many, some of which are detailed hereinbelow:

(1) Circuit design is very simple and straight forward; given silicon controlled rectifier turnoff time requirements and peak load current, optimum commutating inductor and capacitor values can be calculated at once.

(2) The linear commutating inductors such as inductors 34, 35 and 73 are non-saturating and therefore inherently acoustically quiet. Accordingly, they are very advantageously utilized in applications where low noise is a consideration.

(3) The commutating capacitors are sized proportionately to carry the peak load current at the instant of commutation; capacitance value need not be chosen to tune out the reactive load component.

(4) The peak instantaneous voltage across the silicon controlled rectifiers as well as the other semiconductors in the circuit is limited to very nearly the peak unidirectional potential supply. Thereby, there is permitted the use of semiconductors rated at just a little above the peak voltage of the unidirectional potential supply.

(5) The circuit permit output voltage control and the possibility of protection against commutation failures by suitable polarity sensing arrangements.

(6) The operation of these circuits minimizes commutation circuit losses which is an important consideration particularly at high frequencies. In addition, the commutation action of the circuit tends to minimize current and voltage transients imposed upon the unidirectional potential supply.

While there have been shown particular embodiments of this invention it will, of course, be understood that it is not intended to be limited thereto since many modifications both in the circuit arrangements and in the instrumentalities employed therein may be made and it is therefore contemplated in the appended claims to cover any such modifications as fall within the true spirit and scope of the invention.

What is claimed as new and desired to be secured by Letters Patent of the United States is:

1. A circuit for converting the output from a unidirectional potential source to an A.C. power output comprising, a first series arrangement of first, second, third and fourth gate controlled rectifiers connected across said source, a second series arrangement of fifth, sixth, seventh and eighth gate controlled rectifiers connected across said source, a first commutating capacitor connected between the junctions of said first and second and said fifth and sixth gate controlled rectifiers, a second commutating capacitor connected between the junctions of said third and fourth, and seventh and eighth gate controlled rectifiers, a load connected between the junctions of said second and third and said sixth and seventh gate controlled rectifiers, an A.C. source for gating said first and fifth gate controlled rectifiers during successively occurring half cycles of output from said D.C. source, first means in circuit with said A.C. source for phase shifting the output thereof, means for applying the output of said first phase shifting means to said fourth and eighth gate controlled rectifiers to gate said last named gate controlled rectifiers at successive half cycles of output from said first phase shifting means, said first and eighth and said fourth and fifth gate controlled rectifiers being respectively gated by half cycles of like polarity, second means in circuit with said first phase shifting means for phase shifting the output of said first phase shifting means, means for applying the output of said second phase shifting means to said second, third, sixth and seventh gate controlled rectifiers respectively to successively gate as respective pairs said second and seventh and said sixth and third gate controlled rectifiers at successive half cycles of output from said second phase shift means.

2. A circuit as defined in claim 1 and further including first, second, third and fourth reverse poled diodes connected across the pairs of said first and second, third and fourth, fifth and sixth and seventh and eighth gate controlled rectifiers respectively.

3. A circuit as defined in claim 2 and further including an inductance connected between the junction of said first and second diodes and said second and third gate controlled rectifiers and an inductor connected between the junction of said third and fourth diodes, and the junction of said sixth and seventh gate controlled rectifiers.

4. A circuit as defined in claim 3 and further including a filter comprising the series arrangement of a third capacitor and a third inductor connected in series with said load.

5. A circuit as defined in claim 4 and further including means for sensing the polarity of said load to indicate a proper commutation and means responsive to the output of said polarity sensing means for effecting the application of said second phase shifting means to said second, third, sixth and seventh gate controlled rectifiers.

6. A circuit as defined in claim 5 and further including a source of reference voltage having a value representative of a desired output voltage, means in circuit with said load for deriving a voltage representative of the voltage across said load, means in circuit with said reference voltage source and said representative voltage deriving means for comparing said last named voltages to produce a difference voltage therebetween, and means for applying said difference voltage to said first phase shifting means to shift the phase of the output of said A.C. source in accordance with said difference voltage.

7. A circuit for converting the output from a unidirectional potential source to an A.C. power output comprising a first series arrangement of first, second, third and fourth gate controlled rectifiers connected across said source, a second series arrangement of fifth, sixth, seventh and eighth gate controlled rectifiers connected across said source, a first commutating capacitor connected between the junctions of said first and second and said fifth and sixth gate controlled rectifiers, a second commutating capacitor connected between the junctions of said third and fourth, and said seventh and eighth gate controlled rectifiers, a load connected between the junction of said second and third and said sixth and seventh gate controlled rectifiers, means for gating said first and fifth gate controlled rectifiers during successively occurring first and second gating periods respectively, means for gating said fourth and eighth gate controlled rectifiers during successively occurring third and fourth gating periods respectively, means for establishing a desired phase displacement of said third and fourth periods with respect to said first and second periods, means for gating said second and seventh controlled rectifiers during fifth gating periods and said third and sixth gate controlled rectifiers during sixth gating periods of successively occurring fifth and sixth gating periods, means for establishing a desired phase displacement of said fifth and sixth periods with respect to said first, second, third and fourth gating periods.

8. An arrangement according to claim 7 comprising means for coupling respective reverse poled diodes across pairs of said first and second, third and fourth, fifth and sixth, and seventh and eighth gate controlled rectifiers.

9. An arrangement according to claim 8 wherein said coupling means comprises a common first inductance coupling the junction between said second and third gate controlled rectifiers to the diodes associated with said first, second, third and fourth gate controlled rectifiers, and a common second inductance coupling the junction between said sixth and seventh gate controlled rectifiers to the diodes associated with said fifth, sixth, seventh and eighth gate controlled rectifiers.

References Cited

UNITED STATES PATENTS

| | | | |
|---|---|---|---|
| 3,010,062 | 11/1961 | VanEmden | 321—45 X |
| 3,074,030 | 1/1963 | Hierholzer | 331—45 X |
| 3,101,439 | 8/1963 | Lilienstein et al. | |
| 3,103,616 | 9/1963 | Cole et al. | |
| 3,109,977 | 11/1963 | Redfern. | |
| 3,181,053 | 4/1965 | Amato. | |
| 3,207,974 | 9/1965 | McMurray | 321—45 |
| 3,247,447 | 4/1966 | Flairty | 321—45 X |

JOHN F. COUCH, *Primary Examiner.*

W. SHOOP, *Assistant Examiner.*